United States Patent
De Feraudy et al.

(10) Patent No.: US 7,803,848 B2
(45) Date of Patent: *Sep. 28, 2010

(54) METHOD FOR SELECTIVELY SEPARATING USED FRAGMENTED ORGANIC MATERIALS BY MEANS OF DENSE AQUEOUS SUSPENSIONS

(75) Inventors: Hugues De Feraudy, Charentay (FR); Henri Seinera, Oullins (FR)

(73) Assignee: Galloo Plastics, Halluin (FR)

( * ) Notice: Subject to any disclaimer, the term of this patent is extended or adjusted under 35 U.S.C. 154(b) by 127 days.

This patent is subject to a terminal disclaimer.

(21) Appl. No.: 10/576,256

(22) PCT Filed: Oct. 15, 2004

(86) PCT No.: PCT/FR2004/002634

§ 371 (c)(1),
(2), (4) Date: Dec. 22, 2006

(87) PCT Pub. No.: WO2005/037438

PCT Pub. Date: Apr. 28, 2005

(65) Prior Publication Data

US 2007/0138064 A1    Jun. 21, 2007

(30) Foreign Application Priority Data

Oct. 15, 2003    (FR)    ................... 03 12031

(51) Int. Cl.
*C08J 11/04*    (2006.01)
(52) U.S. Cl. .................. 521/40; 521/40.5; 521/41; 521/46; 521/47.5; 521/48; 528/480; 528/502 R; 528/502 A; 241/19; 241/22; 209/132; 209/142; 209/162; 209/172.5; 209/724

(58) Field of Classification Search .............. 209/172.5, 209/3.1, 155, 724, 132, 142, 162; 521/48.5, 521/40, 40.5, 41, 48, 41.5, 42, 42.5, 46, 46.5, 521/47; 528/480, 488, 489, 491, 502 R, 528/502 A; 241/19, 20, 22

See application file for complete search history.

(56) References Cited

U.S. PATENT DOCUMENTS 4,504,643 A * 3/1985 Boutin et al. ................ 526/287

(Continued)

FOREIGN PATENT DOCUMENTS

DE    4309716    9/1994

(Continued)

*Primary Examiner*—Ling-Siu Choi
*Assistant Examiner*—Frances Tischler
(74) *Attorney, Agent, or Firm*—Baker Donelson Bearman, Caldwell & Berkowitz, PC (57) ABSTRACT

The invention relates to a method for selectively separating synthetic organic materials such as polymers and/or reinforced or non-reinforced copolymers in the form of wastes, in particular domestic wastes recyclable in order to be reused. Said synthetic organic materials are recuperated from broken used cars and obsolete consumer durable products. The inventive method for selective separation consists in separating materials which have an identical density threshold value and are selected from a dense medium comprising separate liquid fluid suspensions which consist of powdery disperses particles in an aqueous phase and are stabilized with respect to the density threshold value selected in such a way that a selective separation of a determined fraction of the mixture of separable used material is initiated.

30 Claims, 2 Drawing Sheets

U.S. PATENT DOCUMENTS

| | | |
|---|---|---|
| 5,738,222 A | 4/1998 | Allies et al. |
| 6,335,376 B1 | 1/2002 | Arola et al. |
| 6,460,788 B1 | 10/2002 | De Feraudy |
| 2004/0035757 A1 | 2/2004 | Vandeputte |

FOREIGN PATENT DOCUMENTS

| | | | |
|---|---|---|---|
| DE | 4335570 | | 11/1994 |
| DE | 19964175 A1 | | 12/2001 |
| EP | 0918616 B1 | | 7/1997 |
| GB | 1543770 | | 4/1979 |
| WO | WO 2004/009200 | * | 1/2004 |

\* cited by examiner

FIGURE 1

FIGURE 2

METHOD FOR SELECTIVELY SEPARATING USED FRAGMENTED ORGANIC MATERIALS BY MEANS OF DENSE AQUEOUS SUSPENSIONS

CROSS REFERENCE TO RELATED APPLICATIONS

This application is a §371 National Stage Application of International Application No. PCT/FR04/002634 filed Oct. 15, 2004 which claims priority to French Application No. 0312031 filed Oct. 15, 2003.

BACKGROUND OF THE INVENTION

1. Field of the Invention

The invention relates to a method for selectively separating mixed synthetic organic materials such as filled or unfilled polymers and/or copolymers in the form of wastes and particularly recyclable domestic wastes for reuse, these synthetic organic materials originating from the destruction of cars and obsolete durable consumer products at the end of their lives by grinding, the said selective separation method consisting of separating these materials at a chosen density threshold in a dense medium formed from non-viscous separative liquid suspensions which consist of powder particles dispersed in an aqueous phase and stabilised at a density threshold value chosen so as to provoke the selective separation of a determined fraction of the mixture of waste materials to be separated.

2. Description of Related Art

The waste synthetic organic materials concerned generally originate from the destruction of cars and obsolete durable consumer products at the end of their lives by grinding, in which a large number of different types of synthetic organic materials are present, including filled or unfilled polymers and/or copolymers, with or without fire retardant, with or without additives, are considered to be reusable, and in which a large number of other materials are considered as being unwanted contaminants such as metals, minerals and other various contaminants that must firstly be eliminated. Other wastes, such as mixed industrial wastes containing synthetic organic materials and packaging wastes such as polymers and/or copolymers originating from municipal tips and also containing mixed polymer materials can also be considered as being potentially reusable.

In industries for recycling waste synthetic organic materials to be reused, various methods are used for separating more or less polluting and more or less polluted stream constituents with a variable concentration of reusable synthetic organic materials that have to be separated from the pollutants, concentrated and sorted by homogeneous streams of the different types of synthetic organic materials present, for example such as polyethylene, polypropylene, polystyrene (PS), acrylonitrile-butadiene-styrene (ABS) copolymer, polyamides (PA), polyvinyl chloride (PVC), polyesters, polyurethane, polycarbonate, acrylic or metacrylic or other copolymers, all polymers that may or may not be filled, used with additives, and with or without fire retardants.

These known methods can currently be used to extract and separate streams to be treated, composed of mixes of synthetic organic materials to be reused and contaminating materials to be eliminated, these streams including:

a phase of synthetic organic materials with a density less than 1, a phase of synthetic organic materials with a density greater than or equal to 1, a phase of synthetic organic materials, for example consisting of polyethylene, polyurethane foams, film waste, wire waste and others, a phase of contaminating materials to be eliminated, consisting of constituents that cannot be reused in such separation and reuse methods, for example sand, glass debris, wood debris, remaining metals and others.

One of these methods for separation of all types of polymer materials originating from the destruction of cars and/or other objects at the end of their lives by grinding (described in European patent EP 0918606 B) consists of performing a grinding step to fragment synthetic organic materials, then preferably carrying out a mechanical separation based on a shape factor, followed by a first density separation step in which all synthetic organic materials to be reused are separated into two streams:

the first with a density less than 1, particularly and for example including unfilled polyolefins such as polyethylenes (d=0.92 to 0.95), polypropylenes (d about 0.9), ethylene and vinylacetate copolymers, ethylene-propylene rubber (E.P.R) copolymers, ethylene-propylene-diene-monomer (E.P.D.M.) copolymers, polyethylene (PE) foams, polypropylene (PP) foams, polyurethane (PU) foams and others, the other with a density greater than or equal to 1, and for example including particularly:

polystyrene: unfilled PS (d about 1.05)

acrylonitrile-butadiene-styrene copolymers: unfilled ABS (d about 1.07)

polyvinyl chlorides: unfilled rigid PVC (d about 1.30 to 1.40) and filled rigid PVC (d about 1.40 to 1.55), plastified PVC such as plastisol and PVC foams polycarbonates: unfilled PC with density d=1.20 to 1.24, filled PC reinforced with 20% glass fibre with density d=1.3, or filled PC reinforced with 30% of glass fibres with density d=1.44 thermoplastic rubbers, except for thermosetting honeycombed rubbers polyurethanes: filled PU (d=about 1.21)

Talc-filled polypropylenes (PP/talc filled with between 5% and 40% of talc)

filled polyethylenes: (Filled PE containing between 2% and 40% of fillers)

unsaturated polyesters (d varying from about 1.10 to 1.13)

saturated filled or unfilled polyesters (d≧1.20) (frequently filled with glass fibres)

polyamides: filled or unfilled $PA_6$ (d=1.13), $PA_{6.6}$ (d=1.14), $PA_{6.10}$ (d=1.08), $PA_{11}$ (d=1.04), $PA_{12}$ (d=1.02), polymethyl methacrylates: PMMA (d=1.18)

others.

These two streams are treated later to extract each component from them, to separate them into homogenous streams and treat them to make them into formulated pellets that can be used directly for plastic transformation processes.

If the stream of the mix of reusable synthetic organic materials with a density of less than 1 can be efficiently treated by a series of separation steps in aqueous medium using baths with an appropriate density to enable a fine selection of the different polymer compounds present in the said stream, this is not the case for the stream of the mixture of organic materials with a density greater than or equal to 1 for which it is difficult to separate the different synthetic organic materials.

For this second stream that is composed of a mix of filled or unfilled polymers and/or copolymers, with densities varying from 1 to about 1.6, the various synthetic organic materials present in the mix are density separated in hydraulic separators in which the liquid separation medium consists of water, surfactants and mineral compounds such as clays and particularly bentonite and possibly compounds soluble in water such as mineral salts, compounds used to increase the density of the liquid phase and increase it until its density enables separation in principle of the various organic synthetic materials into two distinct phases, one supernatant and the other sinking in the bottom of the separator, each phase forming a new stream for which a new density separation is carried out in turn.

However it is found that the liquid separation media are not sufficiently stable in practice to enable accurate selective separations by density, in other words providing very homogeneous separations into types of sorted materials, particularly in density separation installations in use in industries for processing waste synthetic organic materials to be reused, since streams output from the separation can be mixes of several materials for which the corresponding densities are very similar to each other.

Several particularly annoying phenomena are observed that occur in these liquid density separation media; these annoying phenomena are genuine disadvantages, and are as follows:

a variation of the rheology of the said liquid media, that is demonstrated by a disturbing variation of their viscosity towards a more fluid or a more pasty state, a drift or a variation of the apparent density of liquid media, since the density cannot remain stable at the initially chosen threshold for good separation of waste synthetic organic materials to be reused, this drift (variation) changing the composition of the streams separated by a dense liquid medium, settlement in time of a fraction of the mineral compounds dispersed in the aqueous medium to create the chosen density, partly causing the change in the density of the liquid separation medium, quasi-impossibility of accurately separating filled or unfilled waste synthetic organic materials to be reused, as soon as the density separation of the different materials has to be done for a density difference $\Delta=|0.01|$, in other words within an interval around the chosen density "ds" equal to ds+/−0.005.

Thus, there is an undoubted and important problem about very precise density separation of synthetic organic waste materials to be reused such as filled or unfilled polymers and/or copolymers, consisting of used wastes to be recycled originating from the destruction of cars and obsolete durable consumer products at the end of their lives by grinding, to obtain separated homogeneous material streams without a drift in the density and mix of the selected materials.

A large amount of research work has been done on the use a dense liquid medium to achieve the best possible separation of solid materials with a density equal to at least 1 or very much more than 1 and that are difficult from each other, and there are many industrial applications.

The dense liquid medium used in the state of the art with a density usually greater than 1 is formed of an aqueous phase in which:

soluble mineral salts can be dissolved to increase the real density of the aqueous phase to achieve a required density, powder clays can be dispersed to create a suspension with an apparent density equal to the required density, both of the above mentioned means, namely solubilisation of salts to increase the density of the aqueous phase and the dispersion of clays in the higher density aqueous phase, can be combined to increase the stability of the suspension of clays in the densified aqueous phase, within the limit of what is possible.

For example, for the treatment of minerals, density methods carried out consist of performing a mechanical grinding action to the liberation mesh size and then separating the ore from the gangue in an aqueous suspension of dispersed powder clay, the clay acting as a densifying agent, in the appropriate concentration to enable separation of components to be separated into two phases, one supernatant phase and the other sinking.

However, the stability of the said suspensions at clay concentrations used to prepare densified separative suspensions is not very good because clay concentrations can vary with time depending on the variation of the composition of the gangue present and to be eliminated for which the density is not constant and varies depending on the extraction zone, and the density of the ore to be extracted is not constant either and also varies depending on the extraction area.

The density threshold chosen for the separation is relatively coarse with these methods, and usually the separation sensitivity cannot be better than a single decimal figure, in other words a densified separation medium for which the apparent density will be between 1.4 and 1.5.

For example, separation methods based on the use of dense liquid media are used, in which a sufficient quantity of mineral salts is dissolved in the aqueous phase or a sufficient quantity of powder clays is dispersed in order to determine the separation threshold density in the presence of surfactants, for synthetic organic waste materials to be reused such as fragmented polymer materials to be separated from each other or to be separated from their pollutants.

Documents have described such dense liquid separation media. A first document (DE19964175) describes a technology for the separation of a heterogeneous mix of fragmented polymer materials depending on their apparent density, in a saline aqueous solution forming the dense liquid medium with a predetermined density, the separation being done at laminar stream requiring optimisation of the stream conditions of the saline aqueous solution and the mix of polymer materials to be separated.

The method thus described only appears suitable for a single density value because it appears difficult to vary the density of the dense liquid medium within a wide range of values, this variation being related to the fact that increasing concentrations of dissolved salts are necessary to achieve relatively high densities; consequently, the operating cost of this method can then become unacceptable for the separation of waste synthetic organic materials with very low added value for reuse, particularly because the technology used is affected by obvious corrosive action due to the saline liquid medium.

Another document (U.S. Pat. No. 3,857,489) describes a method for separation of a stream of materials to be separated in a dense aqueous medium made using a powder clay suspension dispersed in water for which the stability is improved due to the addition of a water soluble hetero polysaccharide type of surfactant into the suspension to stabilise the clay. But the separative suspension is not sufficiently stable since a clay particles settlement phenomenon occurs which causes a large variation in the density threshold chosen for the selective separation.

As mentioned above, another document (EP 0918 606 B1) describes a method for the separation of fragmented polymer materials originating from the destruction of cars and/or other objects at the end of their lives by grinding that uses separation on a stream composed of a mix of filled or unfilled polymers and/or copolymers with densities ranging from 1 to 1.6, in a dense liquid medium using a suspension made of a powder clay dispersed in water so as to obtain a density separation medium with a given density threshold. But as has been mentioned, such a separative suspension has disadvantages that are difficult to overcome, for example variation of the rheology and density with time, settlement of the powder clay and the impossibility of fixing a precise density threshold, for example as far as the second decimal figure, and maintaining it.

Another document (U.S. Pat. No. 4,460,788 B1) describes a method of separating all categories of polymers originating from wastes including a grinding step, a mechanical separation step and two density separation phases in which the density varies upwards or downwards.

In the density separation phase, the liquid medium in the hydraulic separator contains an aqueous phase, a powder inorganic compound that is clay put in suspension to increase the density of water, and a wetting agent (based on a fatty alcohol modified with ethylene oxide and/or propylene oxide) that also maintains the inorganic compound in suspension. With this separation method, the size of particles in suspension is never mentioned either through a size grading cut-off or through a median diametric dimension of these particles; this lack of precision is a problem that particularly affects the stability of the suspension and more particularly the stability of the density required for this suspension, due to the obvious segregation of the largest particles that sink to the bottom of the container.

Another document (U.S. Pat. No. 6,335,376 B1) describes a method of separating polymers present in a mix of different polymers containing neither metals nor pollutants to be eliminated such as glass, foam, wood or other. The claimed method consists of heating the mix of these different polymers after dimensional selection, to cause bubbling of at least of the polymers of the said mix to be separated and then separating it from the said mix due to a change in the apparent density of the said polymer caused by heating.

This modification of the apparent density creates a differentiation between at least one of the polymers in the heated mix and the other polymers in the mix and a selective separation of alterations of the densities of each polymer in successive steps.

This method uses particular separation means that apply heat to destructure the polymer materials to be separated, instead of using an aqueous suspension of solid powder particles to create a separation density level.

Thus, the state of the art proposes different methods for the separation of materials, such as materials originating from the destruction of cars and/or durable consumer products at the end of their lives by grinding such as household appliances, electronic or other equipment which, after metals have been recovered, are synthetic organic materials, using dense liquid media with all the disadvantages mentioned above.

But the state of the art does not include any methods for the particularly precise separation of the different types of constituents with a density equal to at least 1 and usually much greater than 1, forming a mix of fragmented synthetic organic waste materials to be reused.

SUMMARY OF THE INVENTION

The industrial problem that arises after examining the state of the art and that appears even more insoluble after considering this state of the art, is to create a corresponding method and installation for precise separation by difference in density. Such a precise separation method can be achieved using a dense liquid medium of complex mixes of all types of organic synthetic waste materials, to be separated into individual types, each with a density equal to at least 1, in order to reuse them by recycling, all these materials being filled or unfilled, thermoplastic or thermosetting polymers and/or copolymers.

DETAILED DESCRIPTION OF A PREFERRED EMBODIMENT

Examples of materials useful in the present invention include all thermoplastics such as polyolefins and olefinic copolymers, PVC and derivatives, polystyrene and its copolymers, cellulose derivatives, polyamides, acrylic and other polymers, etc., and also thermosetting plastics such an unsaturated polyesters, cross linked polyurethanes, phenoplasts, aminoplasts, epoxy resins and others, etc., and all special polymers such as polycarbonate, polyimides, linear polyurethanes, saturated polyesters, silicones, polymers containing fluoride or other polymers, synthetic and other elastomers, etc., these organic products possibly being used alone or mixed, but also possibly being modified by mineral fillers, reinforcing fibres, flame retarders, impact modifiers, colouring agents, heat and light stabilizers, lubricants, antistatic products, expansion agents and others.

Many objectives are assigned to the invention, so that at least most of the disadvantages that appeared in the state of the art can be eliminated.

A first purpose of the invention is to create a method and its corresponding industrial installation for selectively separating synthetic organic materials in a mixture, such as various types of filled or unfilled polymers and/or copolymers, including wastes to be recycled for reuse. Such organic materials to be reused originate from the destruction of cars and obsolete durable consumer products at the end of their lives by grinding, and are density separated at a chosen density threshold "ds" to provoke separation, the separation being done in a dense liquid medium formed from stable separative suspensions composed of powder particles dispersed in an aqueous phase.

Other objectives of the invention are to create a method and industrial installation for selectively separating the above mentioned materials by density, such that:

the rheology of separative suspensions remains stable and does not deviate in any way due to fluidisation or thickening of the dense liquid medium, the apparent density "ds" produced for each separative suspension does not drift due to the destabilisation effect of the suspension in time causing settlement of a variable quantity of the initially dispersed powder particles, at least almost all powder particles actively and effectively participate in creation of the apparent density of separative suspensions due to their dimensional uniformity, without it being necessary to eliminate particles from the dense liquid medium as they settle, because they are too large and hence they are too heavy, the selective and precise separation of various synthetic organic materials in a mix to be sorted in which the differential sort sensitivity from one material to another can be as good as $\Delta=|0.001|$ or even the target density value "ds" within $\pm 0.0005$.

According to the various objectives mentioned above, the selective density separation method of synthetic organic waste materials to be recycled for reuse with a density equal to at least 1 and originating from the destruction of cars and durable consumer products at the end of their lives by grinding, household appliances, electronic equipment, is capable of eliminating the disadvantages with the state of the art mentioned above, and at the same time provides substantial improvements not possible with previously described means.

According to the invention, the selective separation method for each constituent of a mix of organic synthetic materials and particularly fragmented waste materials with a density equal to at least 1 and to be reused by recycling, consists of separating them by introducing the said mix into a dense liquid medium that is an aqueous suspension of an appropriate quantity of powder particles dispersed in an aqueous phase, to create a density level "ds" chosen as the separation threshold of the various fragmented synthetic organic materials to be selectively separated by type, characterised in that the said separative suspension is made selective, stable and having a constant density with a precision of ±0.0005 about the chosen density threshold "ds" for the selective separation, when it is formed from:

a) powder particles with a size grading cut-off not more than 30 μm, preferably not more than 20 μm and even better not more than 5 μm, these solid powder particles thus sized being dispersed and present in the aqueous phase in a sufficient quantity to reach the chosen density threshold "ds", b) a water soluble stabiliser to stabilise the rheological and invariance characteristics of the apparent density "ds" with a precision of the said density "ds" of the suspension of solid powder particles equal to ±0.0005, c) an aqueous phase.

The method for selective separation of the mix of synthetic organic waste materials is applicable to all mixed and fragmented filled or unfilled polymer and/or copolymer materials to be reused, with thermoplastic or thermosetting origin.

With the method according to the invention, the powder particles used in the formation of the aqueous suspension for precise separation of different types of waste synthetic organic materials to be reused in the form of a mix of fragmented materials, are selected such that:

the rheology remains stable in time, in other words there is no significant variation from its initial state towards a more fluid or a denser state, the apparent density "ds" chosen as the precise separation and extraction threshold of a type of waste synthetic organic material from the mix of waste materials containing it, reaches and stays at this apparent density value "ds" with a targeted precision within the interval "ds±0.0005", thus resulting in a density sort sensitivity between different materials.

The powder particles used according to the invention may be of natural or synthetic origin.

When the powder particles are of natural origin, they may be chosen from among the group of mineral powder materials formed by clays, that can form a stable plastic suspension in contact with water, possibly in the groups composed of the kaolinites group for example such as kaolinite, dickite, halloysite, disordered kaolinites, serpentines; the micas group for example such as muscovite, biotite, paragonite, pyrophyllite and talc, illites and glauconite; the montmorillonites group for example such as beidellite, stevensite, saponite, hectorite; the chlorites group, the vermiculites group; the interstratified clays group for which the unit structure is a combination of the previous groups; the fibrous clays group, for example such as attapulgite (palygorskite), sepiolite; or the group consisting of calcium carbonate (calcite), magnesium carbonate, dolomite (double calcium and magnesium carbonate), dehydrated calcium sulphate (gypsum), barium sulphate, talc, alumina, silica, titanium dioxide, zirconia, taken alone or mixed.

Powder particles with a synthetic origin may be selected from among the group consisting of glass powders, precipitated calcium carbonate, metallic powders, taken alone or mixed.

The said powder particles used according to the invention must have a size grading cut-off not more than 30 μm, preferably not more than 20 μm and even better not more than 5 μm, so as to create stable suspension conditions by their dispersion in the aqueous phase.

Furthermore, the median diametric dimension of these powder particles could be limited to 5 μm and preferably between 1 μm and 0.005 μm.

Several size grading cut-offs of a single powder component such as calcium carbonate, or several powder compounds such as calcium carbonate and kaolin, can be mixed to refine the separation threshold more precisely at the chosen density "ds".

Similarly, powder particles selected such that the diameter of the majority of particles are within limits recommended in the framework of the invention obtained using a selective sort, can be used to refine the separation threshold more precisely at the chosen density "ds".

When the dimensional characteristics of the powder particles are greater than the limiting values mentioned above, it becomes clear that the dense separative suspensions obtained by their dispersion in the aqueous phase lead to sedimentation phenomena, unstable characteristics and deviation from the targeted threshold "ds", to achieve the required precise separation of the waste synthetic organic materials.

The quantity by weight of powder particles dispersed in the aqueous phase is dependent on the density threshold "ds" chosen for precise separation of one type of waste polymer materials with a density usually greater than 1, from a mix of waste materials containing it.

For example, the quantity of powder particles (ground $CaCO_3$) necessary to separate unfilled polystyrene (PS) with a density of 1.05 from an unfilled acrylonitrile-butadiene-styrene (ABS) copolymer with a density of 1.07, is 99 g per liter of the aqueous phase to create a precise separation density medium for these two materials with a density "ds" equal to exactly 1.06.

With the method according to the invention, the water soluble agent for stabilisation of rheological characteristics and to maintain the apparent density "ds" with a precision of ±0.0005 about the said density "ds" of the suspension of solid powder particles, is chosen from the group composed of known water soluble stabilisation agents, for example such as phosphates and polyphosphates, alkylphosphate esters, alkylphosphonate, alkylsulfate, alkylsulfonate esters that cause deflocculation of colloidal clays and enable the use of a high density and low viscosity suspension, lignin, lignosulfonates in the form of calcium, sodium, iron, chromium, iron and chromium salts, copolymers of maleic anhydride and sulfonic styrene acid, substituted, neutralised, esterified or non-esterified copolymers of methylacrylamide and (methyl) acrylic acid copolymers, sulfonic methylacrylamido-alkyl acid and (methyl) acrylamide acid copolymers, water soluble polymers of acrylic acid used in acid form or possibly wholly or partly neutralised by alkaline and/or alkali earth agents, by amines and/or salified by single-valent and/or polyvalent ions, and/or esterified, or from among water soluble acrylic copolymers with a phosphated, phosphonated, sulphated or sulfonated pattern.

Preferably, the said water soluble agent may be chosen from among water soluble acrylic copolymers, of which only some are known, satisfying the general formula:

in which:
Z is a phosphate, phosphonate, sulphate, sulfonate type pattern with at least one free acid function, any other acid function possibly being occupied by a cation, an ammonium group, an amine, an alkyl in $C_1$ to $C_3$, an aryl in $C_3$ to $C_6$ substituted or not, an alkylaryl, an ester in $C_1$ to $C_{12}$ and preferably in $C_1$ to $C_3$, or a substituted amide.

n is equal to a value of between 0 and 95,
p is equal to a value of between 95 and 5,
q is equal to a value of between 0 and 95,
the total value of n+p+q being equal to 100, knowing that n and q may be zero separately, $R_1$ and $R_2$ can both be hydrogen simultaneously, or one may be hydrogen while the other may be a carboxylic function that may or may not be esterified by an alcohol in $C_1$ to $C_{12}$ and preferably in $C_1$ to $C_4$, $R_3$ may be hydrogen or an alkyl radical in $C_1$ to $C_{12}$ and preferably in $C_1$ to $C_4$, $R_4$ and $R_5$ may both simultaneously or separately be hydrogen or an alkyl radical in $C_1$ to $C_{12}$ and preferably in $C_1$ to $C_4$, a substituted or non-substituted aryl, a carboxylic function that may or may not be esterified by an alcohol in $C_1$ to $C_{12}$ and preferably in $C_1$ to $C_4$, $R_6$ is a radical that sets up the link between the pattern Z and the polymeric chain, this radical $R_6$ possibly being an alkylene with formula $(-CH2-)_r$ in which r may be equal to values in the interval 1 to 12, an oxide or polyoxide of alkylene with formula $(-R_8O-)_s$ in which $R_8$ is an alkylene in $C_1$ to $C_4$ and s may be any value from 1 to 30, or a combination of the two formulas $(-CH2-)_r$ and $(-R_8O-)_s$, $R_7$ can be hydrogen or an alkyl radical in $C_1$ to $C_{12}$ and preferably in $C_1$ to $C_4$, $R_9$ and $R_{10}$ may be both simultaneously hydrogen, or one may be hydrogen and the other may be a carboxylic group, an ester in $C_1$ to $C_{12}$ and preferably in $C_1$ to $C_3$, an alkyl in $C_1$ to $C_{12}$ and preferably in $C_1$ to $C_3$, an aryl in $C_5$ or $C_6$ or an alkylaryl, $R_{11}$ may be hydrogen, a carboxylic group, an alkyl in $C_1$ to $C_3$ or a halogen, $R_{12}$ may be an ester in $C_1$ to $C_{12}$ and preferably in $C_1$ to $C_5$, a substituted or non-substituted amide, an alkyl in $C_1$ to $C_{12}$ and preferably in $C_1$ to $C_3$, an aryl in $C_5$ or $C_6$, an alkylaryl, a halogen, a carboxylic group or an alkyl or aryl phosphated, phosphonated, sulphated, sulfonated group.

The quantity by weight of the water soluble stabilisation agent is expressed as the dry weight of the said agent as a percentage of the dry weight of powder particles put in suspension. This weight quantity of the said agent is between 0.02% and 5%, and preferably between 0.1% and 2% dry weight of the dry weight of the powder particles.

The water soluble stabilisation agent is a copolymer with a molecular mass $M_w$ generally between 5000 and 100 000.

The water soluble stabilisation agent is in the form of an aqueous copolymer solution that may or may not be partially or wholly neutralised using a neutralisation agent chosen from the group composed of sodium, potassium ammonium, calcium, magnesium hydroxides, and primary, secondary or tertiary, aliphatic and/or cyclic amines such as mono, di, tri ethanolamines, mono and diethylamines, cyclohexylamine, methylcyclohexylamine, etc.

With the method according to the invention, the aqueous phase is chosen to be water with a conductivity preferably not more than 50 ms, and even better water with a conductivity of between 0.2 ms and 40 ms, it being understood that the unit used for the measurement of conductivity is the SIEMENS and that the water measurements used are made in $10^{-3}$ Siemens, in other words millisiemens, ms.

The aqueous medium used may be chosen from the group consisting of different types of water such as spring water, drinking water, treated or untreated industrial water, possibly but not necessarily circulating in a closed circuit, sea water, knowing that the stability of the suspension at the chosen threshold density "ds" to make a precise separation is achieved when the two criteria, namely (a) the size of the particles, and (b) the presence of a water soluble stabilising agent, are combined.

According to the invention, stable suspensions consisting of an appropriate quantity of dispersed powder particles in an aqueous phase to create a precise density level "ds" chosen as the separation threshold for various synthetic fragmented organic waste materials to be selectively separated based on the precision of the density of the separation medium, are prepared by stirring during the controlled addition of sufficient quantities of powder particles to obtain the required density threshold, in the presence of the water soluble stabilisation agent.

Stable suspensions of powder particles according to the invention,
  enable a precise and selective separation of different synthetic organic materials making up a mix to be sorted,
  for which the sort sensitivity from one material to another may reach a differential $\Delta=|0.001|$
  enable efficient separation of polymer materials, and particularly waste materials to be separated with densities dispersed within the range varying from 1.000 to 1.600.

However, other separation means based on different characteristics or other physicochemical behaviours of the materials have to be used to achieve the said selective separation of different polymer materials and particularly waste materials with exactly the same density but with a different chemical nature.

The method according to the invention is used in an industrial installation comprising at least one hydraulic separator.

A hydraulic separator defines static separators, in other words separators for which the aqueous phase is stagnant or dynamic separators for which the aqueous phase is an active and possibly laminar stream.

If the industrial installation comprises a single hydraulic separator, the chosen density "ds" can be varied:
  to increase it, by the controlled addition of defined powder particles and the water soluble stabilisation agent, into the suspension present in the hydraulic separator until the new chosen threshold density "ds" is reached
  to reduce it, by the addition of water until the new chosen threshold density "ds" is reached.

The density of the separative stable suspension is varied, to increase it or to decrease it, while maintaining mechanical stirring of the dense aqueous medium being corrected and/or while recirculating the dense medium by drawing off from the bottom of the hydraulic separator and reinjection at the top of the said separator.

If the industrial installation comprises several hydraulic separators, the various separators are placed one after the other, using a cascade system operating with stable suspensions each having a precise density threshold "ds", in an increasing or decreasing order of the densities.

In controlling the method according to the invention, the threshold density "ds" of the precise aqueous separative suspension is continuously controlled by appropriate measurement means and is corrected as soon as a drift is detected.

For example, to achieve this, the density of the dense medium contained in each hydraulic separator is controlled using two solenoid valves each opening onto two circuits connected to two reservoirs. One of the reservoirs contains a concentrated "mother" suspension with about 60% of powder particles stabilised with a water soluble stabilisation agent according to the invention, so that a determined quantity of the mother suspension can be added to make an upward correction to any downward drift in the density of the dense precise separation medium.

The other reservoir contains water, and a determined quantity can be added to make a downward correction to any upward drift in the density of the dense precise separation medium.

The density of the dense medium in each hydraulic separator is measured continuously by appropriate measurement instruments that trigger opening of one of the solenoid valves and then close it when the threshold density "ds" is reached.

The process control and the recovery of separated streams are such that there is no need for any stirring. However, each suspension may be recirculated in each hydraulic separator by drawing off the said suspension at the bottom of the said separator and reinjecting it into the upper part.

The separation capacities of the hydraulic separators are of the order of 1 to 10 tonnes per hour and they operate continuously. However, they can operate by campaign and the values of the cut-off densities can then be changed, so that there is not an absolute need for a cascade of more than 3 or 4 hydraulic separators. In this case, the dense medium is custom made for each separator as a function of the separation campaign to be carried out.

EXAMPLE 1

Figure 1:
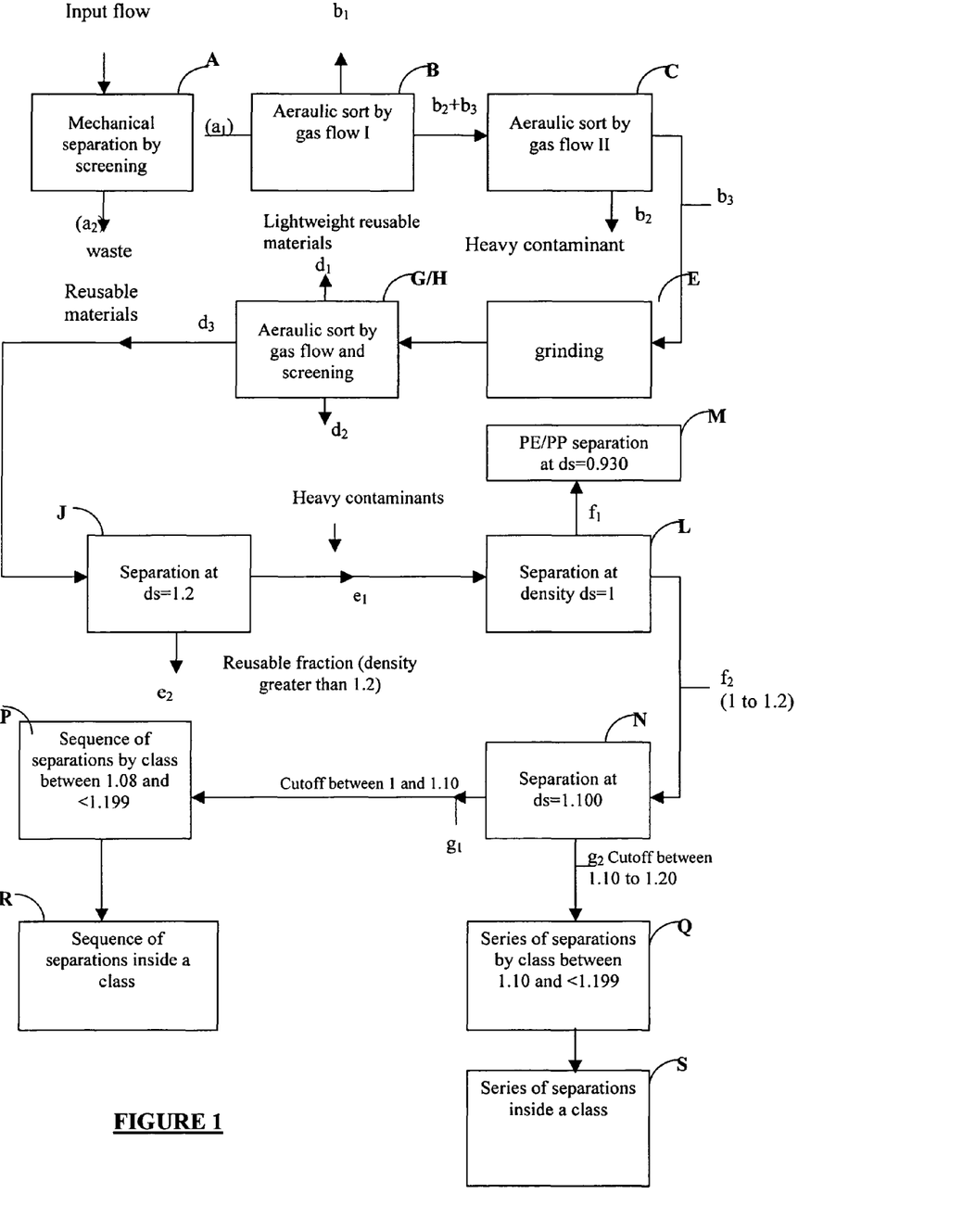

Conforming with FIG. 1

After most of the various metals to be recovered have been separated on an industrial grinding site for household appliances at the end of their lives, a stream of ~22.4 tonnes of reusable materials output from this separation and formed from a mix of waste synthetic polymers to be reused and contaminating materials to be eliminated, is subjected to a preconcentration phase so as to select polymer waste materials to be reused within a density range varying from 1.000 inclusive to 1.200 exclusive to be treated according to the invention from among this mix of waste polymer materials to be reused.

The composition of the material stream used in the preconcentration phase is given in table I below.

TABLE I

| Materials | Ground composition at 25 mm mesh | % content by weight |
|---|---|---|
| Polymers | PE, PP, PS, ABS, talc-filled PP, PVC, etc in fragmented form | 65% by weight |
| Rubber and/or | All types of seals and/or | 29% by weight |

TABLE I-continued

| Materials | Ground composition at 25 mm mesh | % content by weight |
|---|---|---|
| elastomers | electrical cable insulating jackets | |
| Metals | Fragments of ferrous metals and particularly non-ferrous metals - copper, aluminium, etc. | 6% by weight |

The preconcentration is done on the above-mentioned stream, and consists of treating the mix of fragmented materials output from grinding, to eliminate at least some of the materials contaminating the reusable materials. The said mix to be treated comprises:

A fraction of reusable synthetic non-expanded polymer materials, with multiple natures and/or compositions and/or shape factors, varying from a rigid state to a flexible state, Fractions of contaminating materials formed from metallic materials and/or organic materials other than non-expanded polymer materials and/or synthetic polymer materials in an expanded state, and comprises the following treatment steps:

a) A first mechanical separation step at (A) by screening and/or shape factor to extract the fraction of contaminating materials, at least from part of the mix of fragmented materials. The screen mesh was 0-4 mm and 0.04 tonnes of contaminating materials were removed representing 0.18% by weight of the input stream.

b) An aeraulic gas separation step comprising one input of the mix of materials from step a) and three outputs to extract fractions of the separated materials for which the first fraction ($b_1$) consists of a fraction of ultra-lightweight and/or expanded synthetic polymer materials, the second fraction ($b_2$) consists of a fraction of heavy materials present in the mix, and the third fraction ($b_3$) consists of a fraction of synthetic polymer materials to be reused varying from a rigid state to a flexible state. To achieve this, the stream of materials from step a), from which at least part of the fraction of contaminating materials has been removed, was subjected to an aeraulic sort separation in two coupled separators (B) and (C).

In the first aeraulic separator (B), the fraction ($b_1$) representing 0.52 tonnes of so-called lightweight materials was treated by suction and the fractions $b_2$ and $b_3$ extracted through the bottom of the aeraulic separator (B) and representing 21.84 tonnes of so-called heavy materials were collected to be treated in the aeraulic separator (C). The fraction ($b_1$) represents 2.32% by weight of the lightweight materials eliminated from the input stream.

The mix of fraction ($b_2$)+($b_3$) represents 97.5% by weight of heavy materials.

The mix of the fraction ($b_2$) and ($b_3$) representing 20.84 tonnes was added into the second aeraulic sort separator (C). The fraction ($b_2$) composed of contaminating materials such as metals, etc. representing a mass of 2.82 tonnes, is extracted through the bottom of the aeraulic separator (C). The fraction ($b_3$), also extracted from the separator (C) and composed of reusable polymer materials, represents a mass of 19.02 tonnes, namely 84.91% by weight of the input stream to be preconcentrated.

c) A step to grind the fraction ($b_3$) of polymer materials to be reused output from step b), to the liberation mesh inclusive of contaminating materials bonding to or assembled with fragments of the fraction of polymer materials to be reused. This grinding step is performed in zone (E). Grinding is done on a 25 mm mesh.

d) A second aeraulic gas stream separation step in zone (H) of the fraction of synthetic polymer materials to be reused output from grinding step c) to eliminate at least part of the fraction of contaminating materials released during grinding and to extract the fraction of reusable materials forming the required mix, pre-concentrated in reusable materials still containing contaminants.

This aeraulic separation zone that includes firstly a gas stream separation but also a screening means, contains a modular separation device, for example such as that marketed by the WESTRUP Company.

In this aeraulic separation and screening zone:

A fraction ($d_3$) representing 18.36 tonnes of reusable synthetic polymer materials, essentially thermoplastics and some thermosetting plastics, was extracted in the form of flakes, chips and other ground materials representing 82% by weight of the total stream entering into the preconcentration, A fraction ($d_2$) representing 0.14 tonnes of heavy contaminating materials formed from metals and pieces of electrical wires was eliminated by screening, representing 0.63% by weight of the total stream entering into the preconcentration, A fraction ($d_1$) representing 0.52 tonnes of materials that can also be reused was separated by suction, comprising residual polymer foams, thin rubbers, thermoplastic and thermosetting polymer materials in the form of powder, flakes, chips, representing 2.32% by weight of the total stream entering into the preconcentration.

The fraction $d_3$, a mix of reusable waste synthetic polymers output from step d) but with highly variable densities within a range from 0.900 to 1.400 is exposed to a density separation treatment in an aqueous medium, in zone (J), with a density threshold $\geq$1.2 to make a first density selection.

This density separation is done based on a density threshold chosen to be equal to 1.2 in a dense medium formed from an aqueous suspension of powder $CaCO_3$ dispersed in the aqueous phase and stabilised at the value ds=1.2 using a water soluble stabilisation agent that is a water soluble acrylic copolymer with at least one phosphate function.

The dense separation medium is composed of:
An aqueous phase with a conductivity of 6.9 ms and a pH of 7.26
Powder calcium carbonate, for which the median diametric dimension is 1 μm and for which the size grading cut-off is 5 μm (OMYALITE 90® m/arketed by the OMYA Company), at 362 g/liter
the DV 167 water soluble stabilisation agent marketed by the COATEX Company, with a dry weight content equal to 0.25% of the dry weight of $CaCO_3$.

This separation at the density threshold ds=1.2 leads to two fractions:
a first fraction $e_1$ with density less than 1.2 representing 17.15 tonnes of reusable materials (76.56% by weight of the input stream), containing in particular polyethylene (PE), polypropylene (PP), impact and/or fire retardant or non-fire retardant crystal polystyrene (PS), fire retardant or non-fire retardant acrylonitrile-butadiene-styrene (ABS) copolymer, polypropylene with 5% to 40% talc filler by weight, and other polymer materials, and
another fraction $e_2$ with density greater than or equal to 1.2, representing 1.2 tonnes of reusable materials (5.40% by weight of the input stream) in the form of a mix containing polyvinyl chloride, unsaturated filled polyester, filled or other polyurethanes.

The fraction $e_1$, a mix of waste polymers to be reused output from step (J), is subjected to a density separation treatment in an aqueous medium in zone (L), at a density threshold ds=1.000 to extract a supernatant stream ($f_1$) from it consisting of a mix of (PE) and (PP), and a sink stream ($f_2$) consisting of the other waste polymers to be reused.

The supernatant stream ($f_1$) that accounts for 23.40% by weight of the fraction ($e_1$) is subjected to a density separation treatment in a water and alcohol medium (water and isopropanol) at the precise density threshold ds=0.930 in order to recover:
all the polypropylene present that floats, representing 14.74% by weight of fraction $e_1$ (2.528 T)
all polyethylene present that sinks, representing 8.66% by weight of fraction $e_1$ (1.485 T).

These two finely separated polymer waste materials can be directly reused in the form of pellets obtained by extruding them.

The sink stream ($f_2$) that accounts for 76.60% by weight of fraction ($e_1$) formed from an mix unfilled of crystal polystyrene and/or unfilled fire retardant or non-fire retardant impact polystyrene, unfilled acrylonitrile-butadiene-styrene copolymer that is fire retardant for some fractions, and polypropylene filled with 5% to 40% talc, forms the fraction of polymer waste materials with densities within the interval 1.000 to 1.199 inclusive that are to be separated according to the invention.

The fraction $f_2$, a mix of reusable waste synthetic polymers output from the separator (L), is subjected to a density separation treatment in an aqueous medium in zone (N), at a density threshold "ds=1.100".

This density separation is done at the chosen density threshold 1.100 in a dense medium formed from an aqueous suspension of powder $CaCO_3$ dispersed in the aqueous phase and stabilised at the value ds=1.100 using a water soluble stabilisation agent consisting of a water soluble acrylic copolymer with at least one phosphate function.

The dense separation medium is composed of:
an aqueous phase with a conductivity of 6.9 ms and a pH of 7.26
powder calcium carbonate with a median diametric dimension of 1 μm and for which the size grading cut-off is 10 μm (OMYALITE 50® marketed by the OMYA Company), at 169.5 g/liter.
the DV 167 water soluble stabilisation agent marketed by the COATEX Company, with a dry weight content equal to 0.25% of the dry weight of $CaCO_3$.

This separation at the density threshold ds=1.100 leads to the following two fractions:
A first fraction $g_1$ with a density less than 1.100 representing 11.317 tonnes of reusable materials (51.82% by weight of the input stream), in particularly containing polystyrene (PS); acrylonitrile-butadiene-styrene (ABS) copolymer, talc-filled polypropylene and other polymer materials, and
another fraction $g_2$ with a density greater than or equal to 1.100, representing 1.820 tonnes of reusable materials (8.13% by weight of the input stream), in the form of a mix containing talc-filled polypropylene, filled and/or fire retardant polystyrene, filled or fire retardant acrylonitrile-butadiene-styrene (ABS) copolymers, or other copolymer materials.

The stream $g_1$ is actually formed from:
a mix of crystal or impact polystyrenes, treated or not treated to make them fire retardant, and/or with additives composed of various known agents. This is why the range of densities of these various polystyrenes varies between 1.000 and 1.080.

a mix of acrylonitrile-butadiene-styrene copolymers for which the actual density depends on the relative quantities of the three monomers used, by any additives and by fire retardant treatments explaining the range of densities of these various (ABS) copolymers, between 1.000 and 1.080.

a mix of talc-filled polypropylene for which the content of talc as a % by weight may vary from 5% to 20%.

The density range of talc-filled polypropylene is also between 1.000 and 1.080.

This stream $g_1$ is then subjected to separation by increasing density class using a dense separation medium composed of:

an aqueous phase with a conductivity of 6.9 ms and a pH of 7.26, powder calcium carbonate with a median diametric dimension of 1 μm and for which the size grading cut-off is 5 μm (OMYALATE 90® marketed by the OMYA Company), for which the quantities by weight for each density are expressed in table II below, the water soluble stabilisation agent that is a phosphated water soluble acrylic copolymer marketed by the COATEX company, with a dry weight content equal to 0.25% of the dry weight of $CaCO_3$.

The supernatant phase for each known density class represented in table II is recovered and is analysed, and the sink phase is collected and is then input to a density higher than the previous density, so that for each class there is an analysed supernatant phase and a sink phase that in turn is input to a higher density.

There is also a wide distribution of densities for ABS, due to the presence of several types of ABS for which the composition can vary by the relative quantities of their monomers and also by the presence of fire retarders.

talc-filled PP is also distributed in several classes due to large density variations caused by the presence of the talc filler that can vary from 5% by weight to 20% by weight.

The mix of polymer waste materials to be reused extracted from each density class in table II is subjected to a new separation by increasing or decreasing density using a dense separation medium, so as to effectively separate the PS, ABS and talc-filled PP present in the same density class, this dense separation medium consisting of:

An aqueous phase with a conductivity of 6.9 ms and a pH of 7.26,

Powder calcium carbonate with a median diametric dimension of 1 μm and for which the size grading cut-off is 5 μm (OMYALITE 90® marketed by the OMYA company) and for which quantities by weight are expressed in table III below the DV 167 water soluble phosphated copolymer marketed by the COATEX Company, with a dry weight content equal to 0.25% of the dry weight of $CaCO_3$.

For example, only two density separation classes output from table II are selected and treated according to the invention, to illustrate the capacity of the selective separation process for creating stable separative suspensions with invariable density, when the density level "ds" chosen as the separation threshold for the various waste polymer materials to be separated is achieved, the precision of the absolute value of the

TABLE II

| Density ds fixed as the separation threshold | powder $CaCO_3$ in g/l to create ds | Limits of each density class | % by weight in each class | | |
|---|---|---|---|---|---|
| | | | of PS | of ABS | of talc-filled PP |
| 1.020 | 32.30 | [1.000 to 1.020[ | 1.20% | 0.60% | 6.40% |
| 1.042 | 68.70 | [1.020 to 1.042[ | 22.30% | 0.00% | 16.40% |
| 1.050 | 82.20 | [1.042 to 1.050[ | 35.60% | 1.60% | 17.20% |
| 1.053 | 87.30 | [1.050 to 1.053[ | 10.00% | 3.20% | 8.00% |
| 1.055 | 90.70 | [1.053 to 1.055[ | 8.20% | 5.60% | 3.20% |
| 1.058 | 95.80 | [1.055 to 1.058[ | 4.00% | 6.40% | 5.20% |
| 1.060 | 99.20 | [1.058 to 1.060[ | 9.10% | 14.40% | 7.60% |
| 1.065 | 107.80 | [1.060 to 1.065[ | 5.60% | 17.20% | 10.40% |
| 1.070 | 116.50 | [1.065 to 1.070[ | 2.80% | 25.80% | 9.20% |
| 1.080 | 133.90 | [1.070 to 1.080[ | 1.20% | 24.20%% | 16.00% |
| 1.090 | 151.60 | [1.080 to 1.090[ | 0.00% | 1.00% | 0.40% |
| 1.100 | 169.50 | [1.090 to 1.100[ | 0.00% | 0.00% | 0.00% |
| TOTAL | | | 100.00% | 100.00% | 100.00% |

Quantities of $CaCO_3$ used in each density class are determined by the density measurement and can vary depending on the purity of the $CaCO_3$ used.

As shown in table II, most PS is present within the density interval [1.020-1.055[ forming a first group for crystal PS, but a second density group appears in the [1.055-1.070[ interval corresponding to impact PS, remembering that some of the PS present is probably fire retardant. These various density classes are statistically justified by the presence of several PS families in this waste polymer to be reused.

ABS is also distributed in several density classes, but most ABS present is within the density interval [1.058-1.080[.

density can be as good as |0.001|, in other words it is possible to achieve a precision about the chosen value "ds" equal to "ds"±0.0005.

However, it should be remembered that waste polymers with different chemical natures but exactly the same density cannot be separated by the method according to the invention and other separation methods based on other criteria are necessary.

The two density classes derived from table II and treated using the method according to the invention are as follows:

[1.042 to 1.050[ and [1.065 to 1.070[

To achieve this, for each known density class represented in table III, the supernatant phase is recovered and analysed, the sink phase is collected and is then input to a density higher than the previous density, for each class creating an analysed supernatant phase and a sink phase which in turn will be input to a higher density.

This very selective separation gave the results entered class by class in Table III below:

TABLE III

| Density ds defined as the separation threshold | Powder CaCO$_3$ in g/l to create ds | Limits of each density class | % by weight in each class | | |
|---|---|---|---|---|---|
| | | | PS | ABS | talc-filled PP |
| 1.043 | 70.40 | [1.042-1.043[ | 0.000 | 0.000 | 0.609 |
| 1.044 | 72.80 | [1.043-1.044[ | 0.000 | 0.000 | 0.610 |
| 1.045 | 75.50 | [1.044-1.045[ | 0.000 | 0.000 | 0.756 |
| 1.046 | 76.20 | [1.045-1.046[ | 0.000 | 0.000 | 1.025 |
| 1.047 | 77.20 | [1.046-1.047[ | 0.000 | 0.000 | 0.305 |
| 1.048 | 78.80 | [1.047-1.048[ | 0.000 | 0.000 | 0.920 |
| 1.049 | 80.50 | [1.048-1.049[ | 7.100 | 0.000 | 3.050 |
| 1.050 | 82.20 | [1.049-1.050[ | 15.125 | 0.000 | 9.125 |
| 1.066 | 109.60 | [1.065-1.066[ | 1.050 | 0.115 | 6.125 |
| 1.067 | 111.30 | [1.066-1.067[ | 0.920 | 0.320 | 1.952 |
| 1.068 | 113.00 | [1.067-1.068[ | 1.250 | 0.825 | 1.060 |
| 1.069 | 114.70 | [1.068-1.69[ | 1.063 | 5.690 | 0.743 |
| 1.070 | 116.50 | [1.069-1.070[ | 1.317 | 10.250 | 0.520 |

As shown in table III, the method according to the invention gives excellent control over selective density separation of the polymer materials present in the mix, the sensitivity of the separation density being equal to ±0.0005 about the chosen density threshold "ds".

However, the initial industrial mix dealt with in this example contains polymer materials with the same density but a different composition, such that other separation means have to be used to separate each type of polymer with identical density present in each fraction.

EXAMPLE 2

Figure 2:
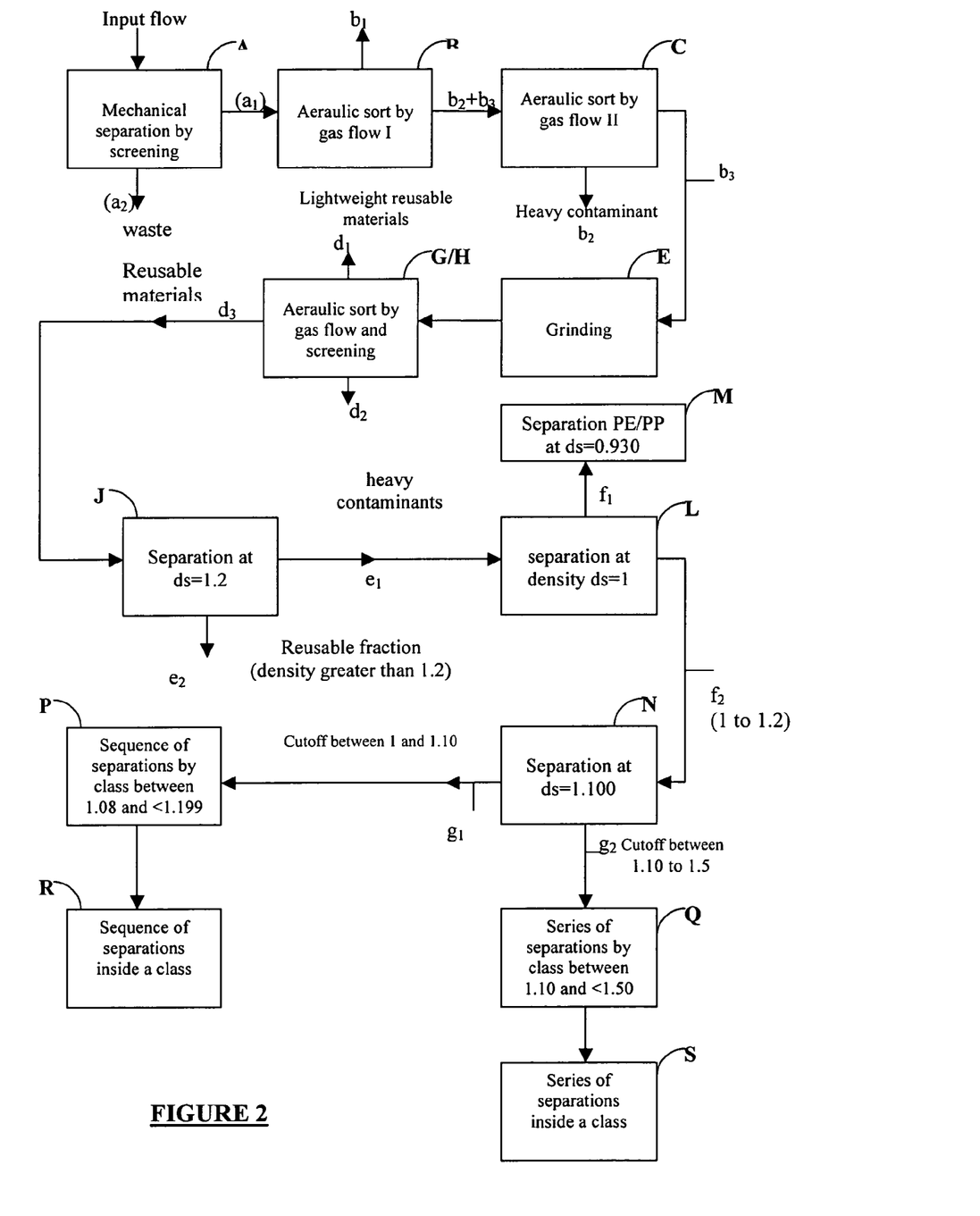

Conforming with FIG. 2

After most of the various metals to be recovered have been separated on an industrial grinding site for household appliances at the end of their lives, a stream of 22.92 tonnes of reusable materials output from this separation and formed from a mix of waste synthetic polymers to be reused and contaminating materials to be eliminated, is subjected to a preconcentration phase as described in example 1 so as to select polymer waste materials to be reused within a density range varying from 1.000 inclusive to 1.600 exclusive to be treated according to the invention from among this mix of polymer waste materials to be reused in order to recover polyvinyl chloride (PVC).

The composition of the material stream used in the preconcentration phase is given in table IV below.

TABLE IV

| Materials | Ground composition at 25 mm mesh | % content by weight |
|---|---|---|
| Polymers | PE, PP, PS, ABS, talc-filled PP, PVC, etc in fragmented form | 19% by weight |
| Rubber and/or elastomers | All types of seals and/or electrical cable insulating jackets | 77% by weight |
| Metals | Fragments of ferrous metals and particularly non-ferrous metals - copper, aluminium, etc. | 4% by weight |

The preconcentration is done on the above-mentioned stream, and consists of treating the mix of fragmented materials originating from grinding, to eliminate at least some of the materials contaminating the reusable materials. The said mix to be treated comprises:

A fraction of reusable synthetic non-expanded polymer materials, with multiple natures and/or compositions and/or shape factors, varying from a rigid state to a flexible state, Fractions of contaminating materials formed from metallic materials and/or organic materials other than non-expanded polymer materials and/or synthetic polymer materials in an expanded state, and comprises the treatment steps as described in example 1:

a) A first mechanical separation step at (A) by screening and/or shape factor to extract the fraction of contaminating materials, at least from part of the mix of fragmented materials. The screen mesh was 0-4 mm and 0.2 tonnes of contaminating materials were removed representing 0.87% by weight of the input stream.

b) An aeraulic gas stream separation step to separate the mix of materials output from step a), in two aeraulic separators (B) and (C) coupled together. In the first aeraulic separator (B), fraction ($b_1$) representing 0.46 tonnes of so-called lightweight materials were treated by suction and the fractions $b_2$ and $b_3$ extracted through the bottom of the aeraulic separator (B) and representing 22.26 tonnes of so-called heavy materials were collected to be treated in the aeraulic separator (C). Fraction ($b_1$) represents 2.01% by weight of the eliminated lightweight materials.

The mix of fractions ($b_2$)+($b_3$) represents 97.12% by weight of heavy materials.

The mix of fractions ($b_2$) and ($b_3$) representing 22.26 tonnes was added into the second aeraulic sort separator (C). The fraction ($b_2$) composed of contaminating materials such as metals, etc. representing a mass of 12.84 tonnes, is extracted through the bottom of the aeraulic separator (C), namely 56.02% of the input stream.

The fraction ($b_3$), also extracted from the separator (C) and composed of reusable polymer materials, represents a mass of 9.42 tonnes, namely 41.10% by weight of the input stream to be preconcentrated.

c) a step in zone (E) on the 25 mm mesh, to grind the fraction ($b_3$) of polymer materials to be reused output from step b), to the liberation mesh inclusive of contaminating materials, sticking to or assembled with fragments of the fraction of polymer materials to be reused.

d) a second aeraulic gas stream step in the zone (H) to separate the fraction of synthetic polymer materials output from the grinding step c) to be reused. This aeraulic separation step comprises firstly a gas stream separation, and also a screening means (for example a modular separation device made by the WESTRUP Company).

In this aeraulic separation and screening zone (H):

A fraction ($d_1$) representing 4.82 tonnes of materials that can also be reused was separated by suction, and comprises residual polymer foams, thin rubbers, thermoplastic and thermosetting polymer materials in the form of powder, flakes, chips, representing 21.03% by weight of the total mass stream entering preconcentration, A fraction ($d_2$) representing 0.10 tonnes of heavy contaminating materials consisting of metals and pieces of electrical and other wires was eliminated by screening, representing 0.44% by weight of the total mass stream entering preconcentration, A fraction ($d_3$) representing 4.50 tonnes of reusable synthetic polymer materials, essentially thermoplastics and a small quantity of thermosetting plastics, was extracted in the form of flakes, chips and other ground forms representing 19.63% by weight of the total mass stream entering into preconcentration.

The fraction $d_3$, a mix of reusable waste synthetic polymers output from step d) but with highly variable densities within a range from 0.900 to 1.600 is exposed to a density separation treatment in an aqueous medium, in zone (J), with a density threshold $\geq 1.500$ to make a first density selection.

This separation is done based on a density threshold chosen to be equal to 1.500 in a dense medium formed from an aqueous suspension of powder $CaCO_3$ dispersed in the aqueous phase and stabilised at the value ds=1.5 using a water soluble stabilisation agent that is a water soluble acrylic copolymer with at least one phosphate function.

The dense separation medium is composed of:
An aqueous phase with a conductivity of 9.8 ms and a pH of 6.90
Powder calcium carbonate, for which the median diametric dimension is 2 μm and for which the size grading cut-off is 20 μm (OMYALITE 90® marketed by the OMYA Company), at 1132 g/liter
the DV 167 water soluble stabilisation agent marketed by the COATEX Company, with a dry weight content equal to 0.3% of the dry weight of $CaCO_3$.

This separation at the density threshold ds=1.5 leads to two fractions:
a first fraction $e_1$ with density less than 1.5 representing 4.05 tonnes of reusable materials (17.67% by weight of the input stream), containing in particular polyethylene (PE), polypropylene (PP), impact and/or fire retardant or non-fire retardant crystal polystyrene (PS), fire retardant or non-fire retardant acrylonitrile-butadiene-styrene (ABS) copolymer, polypropylene with 5% to 40% talc filler by weight, and other polymer materials, and
another fraction $e_2$ with density greater than or equal to 1.5, representing 0.45 tonnes of reusable materials (1.96% by weight of the input stream) in the form of a mix containing filled polyvinyl chloride, filled or other polyurethanes.

The fraction $e_1$, a mix of waste polymers to be reused output from step (J), is subjected to a density separation treatment in an aqueous medium in zone (L), at a density threshold ds=1.000 to extract a supernatant stream ($f_1$) from it consisting of a mix of (PE) and (PP), and a sink stream ($f_2$) consisting of the other waste polymers to be reused.

The supernatant stream ($f_1$) that accounts for 43.46% by weight of the fraction ($e_1$) is subjected to a density separation treatment in a water and alcohol medium (water and isopropanol):
at the precise density threshold ds=0.930 in order to recover:
all the polypropylene present that floats, representing 28.25% by weight of fraction $e_1$ (1.144 T)
all polyethylene present that sinks, representing 15.21% by weight of fraction $e_1$ (0.616 T), the two finely separated waste polymer materials can be directly reused in the form of pellets obtained by extruding them.

The sink stream ($f_2$) that represents 2,290 T and accounts for 56.54% by weight of fraction ($e_1$) formed from an unfilled mix of crystal polystyrene and/or fire retardant or non-fire retardant impact polystyrene, unfilled acrylonitrile-butadiene-styrene copolymer that is fire retardant for some fractions, and polypropylene filled with 5% to 40% talc, forms the fraction of waste polymer materials with densities within the interval 1.000 to 1.500 inclusive that are to be separated according to the invention.

The fraction $f_2$, a mix of reusable waste synthetic polymers output from the separator (E), is subjected to a density separation treatment in an aqueous medium in zone (N), at a density threshold "ds=1.100", to separate and collect part of the PS, ABS and talc-filled PP.

This density separation is done at the chosen density threshold 1.100 in a dense medium formed from an aqueous suspension of powder $CaCO_3$ dispersed in the aqueous phase and stabilised at the value ds=1.100 using a water soluble stabilisation agent consisting of a water soluble acrylic copolymer with at least one phosphate function.

The dense separation medium is composed of:
an aqueous phase with a conductivity of 9.8 ms and a pH of 6.9
Powder calcium carbonate for which the median diametric dimension is 2 μm and for which the size grading cut-off is 20 μm (OMYALITE 50® marketed by the OMYA Company), at 169.5 g/liter.
the DV 167 water soluble stabilisation agent marketed by the COATEX Company, with a dry weight content equal to 0.3% of the dry weight of $CaCO_3$.

This separation at the density threshold ds=1.100 leads to the following two fractions:
A first fraction $g_1$ with a density less than 1.100 representing 1.44 tonnes of reusable materials (6.47% by weight of the input stream), in particularly containing polystyrene (PS); acrylonitrile-butadiene-styrene (ABS) copolymer, talc-filled polypropylene and other polymer materials, and treated in accordance with the treatment described in example 1 for this fraction, and
another fraction $g_2$ with a density greater than or equal to 1.100, representing 0.85 tonnes of reusable materials (3.71% by weight of the input stream), in the form of a mix containing polyvinyl chloride (PVC), talc-filled polypropylene (more than 20% filler by weight), filled and/or fire retardant polystyrene and acrylonitrile-butadiene-styrene (ABS) copolymer, filled polyurethane (PU), filled polyethylene (PE) and others, that is treated so that each polymer and more particularly PVC can be reused.

The stream $g_2$ is composed essentially of PVC. This stream $g_2$ is then added into the series of density class separators (Q) created within the interval [1.100 to 1.500[, in which it is separated by increasing density class using a dense separation medium composed of:
An aqueous phase with a conductivity of 9.8 ms and a pH of 6.9
Powder calcium carbonate, for which the median diametric dimension is 3 μm and for which the size grading cut-off is 20 μm (OMYALITE 50® marketed by the OMYA Company), for which the weights are expressed for each density in table V below
the DV 167 water soluble stabilisation agent marketed by the COATEX Company, with a dry weight content equal to 0.3% of the dry weight of $CaCO_3$.

The supernatant phase for each known density class represented in table V is recovered and is analysed, and the sink phase is collected and is then input to a density higher than the previous density, so that for each class there is an analysed supernatant phase and a sink phase that in turn is input to a higher density.

TABLE V

| Density ds defined as the separation threshold | Powder CaCO$_3$ in g/l to create ds | Limits of each density class | % by weight in each class | PS | ABS | PP talc | PP | PE | Others | PVC |
|---|---|---|---|---|---|---|---|---|---|---|
| | | <1.000 | 30.6% | 0 | 0 | 0 | 19.8 | 10.8 | 0 | 0 |
| 1.000 | 0.00 | [1.000-1.100[ | 22.6% | 12.6 | 6.2 | 3.8 | 0 | 0 | 0 | 0 |
| 1.100 | 169.5 | [1.100-1.350[ | 31% | 2 | 6.2 | 11.6 | 0 | 0 | 9.7 | 1.5 |
| 1.350 | 700.0 | [1.350-1.400[ | 2.8% | 0 | 0 | 0 | 0 | 0 | 2.4 | 0.4 |
| 1.400 | 834.5 | [1.400-1.450[ | 3.5% | 0 | 0 | 0 | 0 | 0 | 3 | 0.5 |
| 1.450 | 977.0 | >1.450 | 9.5% | 0 | 0 | 0 | 0 | 0 | 9 | 0.5 |
| TOTAL | | | 100.00% | 14.6 | 12.4 | 15.4 | 19.8 | 10.8 | 21.4 | 2.9 |

As can be seen in table V, the method according to the invention gives excellent control over selective density separation of the polymer materials present, the sensitivity of the separation density being equal to ±0.0005 about the chosen density threshold "ds".

However, the initial industrial mix considered in this example contains polymer materials with the same density but a different composition, so that other separation means have to be used to separate the fractions of each polymer type present with the same density.

EXAMPLE 3

A synthetic medium was prepared with the composition by weight summarised in table VI, in order to confirm the capability of the method according to the invention for selective separation of the constituents of a mix of synthetic organic materials consisting of different types of polymers, some of which have a very similar density, in a dense liquid medium:

TABLE VI

| | | Synthetic mixes | |
|---|---|---|---|
| Polymer | Measured density | kg added | % by weight |
| Ethylene-propylene copolymer | 0.900 | 350 | 46.06 |
| Polystyrene | 1.050 | 100 | 13.16 |
| Ethylene-propylene copolymer with 20% talc filler | 1.060 | 150 | 19.73 |
| Acrylonitrile-butadiene-styrene copolymer | 1.070 | 80 | 10.53 |
| Polyamide 6 | 1.13 | 40 | 5.26 |
| Polyvinyl chloride | 1.38 | 40 | 5.26 |
| Total | | 760 | 100% |

This mix is subjected to a density separation treatment in a dense liquid medium consisting of an aqueous suspension of powder CaCO$_3$ dispersed in the aqueous phase and stabilised at the chosen density value ds using a water soluble stabilisation agent that is a water soluble acrylic copolymer with at least a phosphate function.

The dense separation medium is composed of:

An aqueous phase with a conductivity of 6.9 ms and a pH of 7.26

Powder calcium carbonate with a median diametric dimension of 1 μm and for which the size grading cut-off is 5 μm (OMYALITE 90® marketed by the OMYA company), using the quantities in g/l necessary to create increasing values of the density "ds" of the dense medium, starting from the initial value ds=1.000 up to the value ds=1.200 to achieve selective separation.

the DV 167 water soluble stabilisation agent marketed by the COATEX Company, with a dry weight content equal to 0.25% of the dry weight of CaCO$_3$.

The selective separation is then made through increasing density thresholds "ds" to obtain two polymer fractions for each density threshold "ds", one supernatant with a density of less than "ds" and the other sinking with a density greater than "ds". All information about these selective separations is given in table VII below:

TABLE VII

| Density ds fixed as the separation threshold | Powder CaCO$_3$ in g/l to create ds | Types and quantities of selectively separated polymers | % polymers recovered with respect to the initial synthetic mix |
|---|---|---|---|
| 1.000 | 0.00 | 348 kg of copolymer (E/P) | 99.4 |
| 1.055 | 90.70 | 99 kg of PS | 99.0 |
| 1.065 | 107.80 | 148.6 kg of copolymer (E/P) 20% talc | 99.1 |
| 1.075 | 125.20 | 79.0 kg of ABS | 98.8 |
| 1.200 | 361.60 | 39.5 kg of PA 6 | 98.8 |
| <1200 | | 39.6 kg of rigid PVC | 99.0 |

As can be seen, selective separation of the various polymers present in the initial synthetic mix by increasing density class of an aqueous suspension of CaCO$_3$ in the presence of a suspension stabilisation agent, is precise and efficient, because each polymer present in the initial mix is selectively extracted for each chosen density threshold "ds" for this purpose, without entraining any particular polymer into adjacent classes, each selective separation class having operated precisely according to forecasts and containing only the selected polymer.

Compared with the total mass of the initial synthetic mix (760 kg), the loss of polymers during the selective separation using the method according to the invention is 6.3 kg, in other words 0.83% by weight.

EXAMPLE 4

Conforming with FIG. 1

After most of the various metals to be recovered have been separated on the same industrial grinding site as in example 1 for household appliances at the end of their lives, a stream of 22.4 tonnes of reusable materials formed from a mix of waste synthetic polymers to be reused and contaminating materials, is subjected to a preconcentration phase so as to extract waste polymer materials to be reused within a density range varying from 1.000 to 1.200 to be treated according to the invention from among this mix of waste polymer materials to be reused.

The composition of the material stream used in the preconcentration phase is given in table VIII below.

TABLE VIII

| Materials | Ground composition at 25 mm mesh | % content by weight |
|---|---|---|
| Polymers | PE, PP, PS, ABS, talc-filled PP, PVC, etc in comminuted form | 65% by weight |
| Rubber and/or elastomers | All types of seals and/or electrical cable insulating jackets | 29% by weight |
| Metals | Fragments of ferrous metals and particularly non-ferrous metals - copper, aluminium, etc. | 6% by weight |

Preconcentration is done in the same way as in example 1, starting from the above mentioned mix including:

A fraction of reusable synthetic non-expanded polymer materials, with multiple natures and/or compositions and/or shape factors, varying from a rigid state to a flexible state, Fractions of contaminating materials formed from metallic materials and/or organic materials other than non-expanded polymer materials and/or synthetic polymer materials in an expanded state, comprising treatment steps a) to d) according to example 1.

a) In the first mechanical separation step at (A) by screening and/or shape factor, 0.04 tonnes of contaminating materials were extracted representing 0.18% of the input stream.

b) In step b), the material stream from step a) from which at least part of the fraction of contaminating materials has been removed, was separated by aeraulic sort in two coupled separators (B) and (C).

In the first aeraulic separator (B), the fraction ($b_1$) representing 0.52 tonnes of so-called lightweight materials was treated by suction, and fractions $b_2$ and $b_3$ extracted through the bottom of the aeraulic separator (B) and representing 21.84 tonnes of so-called heavy materials, were collected to be treated in the aeraulic separator (C). The fraction ($b_1$) represents 2.32% by weight of lightweight materials eliminated from the input stream.

The mix of fractions ($b_2$)+($b_3$) represents 97.5% by weight of heavy materials.

The mix of fractions ($b_2$) and ($b_3$) representing 20.84 tonnes was added into the second aeraulic sort separator (C). The fraction ($b_2$) composed of contaminating materials such as metals, representing a mass of 2.82 tonnes, is extracted through the bottom of the aeraulic separator (C).

The fraction ($b_3$), also extracted from the separator (C) and composed of reusable polymer materials, represents a mass of 19.02 tonnes, namely 84.91% by weight of the input stream to be preconcentrated.

c) The step to grind the fraction ($b_3$) of polymer materials to be reused originating from step b), to the contaminating materials liberation mesh inclusive, is done in zone (E), grinding being done on a 25 mm mesh.

d) The second aeraulic gas stream step to separate the fraction of synthetic polymer materials to be reused output from the grinding step c) is done in zone (H), to at least partly eliminate the fraction of contaminating materials released during grinding and to extract the fraction of reusable materials forming the required mix, pre-concentrated into reusable materials still containing contaminants.

This aeraulic separation zone (H) comprises firstly a gas stream separation and also a screening means, and is formed by a modular separation device for example like that marketed by the WESTRUP Company.

In this separation zone (H):

A fraction ($d_3$) representing 18.36 tonnes of reusable synthetic polymer materials was extracted, representing 82% by weight of the total mass of the stream input into the preconcentration, A fraction ($d_2$) representing 0.14 tonnes of heavy contaminating materials formed from metals and pieces of electrical wires was eliminated, representing 0.63% by weight of the total stream entering into the preconcentration, fraction ($d_1$) representing 0.52 tonnes of materials that can also be reused was separated by suction, comprising residual polymer foams, thin rubbers, thermoplastic and thermosetting polymer materials, representing 2.32% by weight of the total stream entering into the preconcentration.

The fraction $d_3$, a mix of reusable waste synthetic polymers output from step d) but with highly variable densities within a range from 0.900 to 1.400 is exposed to a density separation treatment in an aqueous medium, in zone (J), with a density threshold$\geq$1.2 to make a first density selection.

This separation is done based on a density threshold chosen to be equal to 1.2 in a dense medium formed from an aqueous suspension of powder kaolin dispersed in the aqueous phase and stabilised at the value ds=1.2 using a water soluble stabilisation agent that is a water soluble acrylic copolymer with at least one phosphate function.

The dense separation medium is composed of:

An aqueous phase with a conductivity of 6.9 ms and a pH of 7.26

Kaolin, for which the median diametric dimension is 1 µm and the size grading cut-off is 30 µm, at 373.29 g/liter the DV 167 water soluble stabilisation agent marketed by the COATEX Company, with a dry weight content equal to 0.25% of the dry weight of kaolin.

This separation at the density threshold ds=1.2 leads to two fractions:

a first fraction $e_1$ with density less than 1.2 representing 17.20 tonnes of reusable materials (76.78% by weight of the input stream), containing in particular polyethylene (PE), polypropylene (PP), impact and/or fire retardant or non-fire retardant crystal polystyrene (PS), fire retardant or non-fire retardant acrylonitrile-butadiene-styrene (ABS) copolymer, polypropylene with 5% to 40% talc filler by weight, and other polymer materials, and another fraction $e_2$ with density greater than or equal to 1.2, representing 1.16 tonnes of reusable materials (5.18% by weight of the input stream) in the form of a mix containing polyvinyl chloride, unsaturated filled polyester, filled or other polyurethanes.

The fraction $e_1$, a mix of waste polymers to be reused output from step (J), is subjected to a density separation treatment in an aqueous medium in zone (L), at a density threshold ds=1.000 to extract a supernatant stream ($f_1$) from it consisting of a mix of (PE) and (PP), and a sink stream ($f_2$) consisting of the other waste polymers to be reused.

The supernatant stream ($f_1$) that accounts for 23.50% by weight of the fraction ($e_1$) is subjected to a density separation treatment in a water and alcohol medium (water and isopropanol) at the precise density threshold ds=0.930 in order to recover:
- all the polypropylene present that floats, representing 14.76% by weight of fraction $e_1$ (2.54 T)
- all polyethylene present that sinks, representing 8.74% by weight of fraction $e_1$ (1.50 T).

These two finely separated waste polymer materials can be directly reused in the form of pellets obtained by extruding them.

The sink stream ($f_2$) that accounts for 76.50% by weight of fraction ($e_1$) formed from an unfilled mix of crystal polystyrene and/or fire retardant or non-fire retardant impact polystyrene, unfilled acrylonitrile-butadiene-styrene copolymer that is fire retardant for some fractions, and polypropylene filled with 5% to 40% talc, forms the fraction of waste polymer materials with densities within the interval 1.000 to 1.199 inclusive that are to be separated according to the invention.

The fraction $f_2$, a mix of reusable waste synthetic polymers output from the separator (L), is subjected to a density separation treatment in an aqueous medium in zone (N), at a density threshold "ds=1.100".

This separation is done at the chosen density threshold 1.100 in a dense medium formed from an aqueous suspension of powder kaolin dispersed in the aqueous phase and stabilised at the value ds=1.100 using a water soluble stabilisation agent consisting of a water soluble acrylic copolymer with at least one phosphate function.

The dense separation medium is composed of:
- an aqueous phase with a conductivity of 6.9 ms and a pH of 7.26
- kaolin carbonate, for which the median diametric dimension is 1 μm and for which the size grading cut-off is 30 μm, at 174.2 g/liter
- 4 the DV 167 water soluble stabilisation agent marketed by the COATEX Company, with a dry weight content equal to 0.25% of the dry weight of $CaCO_3$.

This separation at the density threshold ds=1.100 leads to two fractions:

a first fraction $g_1$ with density less than 1.100 representing 11.45 tonnes of reusable materials (51.12% by weight of the input stream), containing in particular polystyrene (PS), acrylonitrile-butadiene-styrene (ABS) copolymer, polypropylene with talc filler, and other polymer materials, and another fraction $g_2$ with density greater than or equal to 1.100, representing 1.75 tonnes of reusable materials (7.81% by weight of the input stream) in the form of a mix containing talc-filled polypropylene, filled and/or fire retardant polystyrene, filled or fire retardant acrylonitrile-butadiene-styrene (ABS) copolymers, or other copolymer materials.

The stream $g_1$ is actually formed from:
- a mix of crystal or impact polystyrenes, treated or not treated to make them fire resistant and containing additives consisting of various known agents. This is why the range of densities of these various polystyrenes is between 1.000 and 1.080.
- a mix of acrylonitrile-butadiene-styrene copolymers, for which the genuine density is determined by the relative quantities of the three monomers used, any additives and fire retardant treatments, explaining the range of densities of these various (ABS) products that varies between 1.000 and 1.080.
- a mix of talc-filled polypropylene with a talc content as a % by weight varying from 5% to 20%. The density range of talc-filled polypropylene is also between 1.000 and 1.080.

This stream $g_1$ is then subjected to separation by increasing density class using the dense separation medium comprising:
- an aqueous phase with a conductivity of 6.9 ms and a pH of 7.26,
- powder kaolin with a median diametric dimension of 1 μm and for which the size grading cut-off is 30 μm, for which the quantities by weight for each density are given in table II below
- the water soluble phosphated acrylic copolymer stabilisation agent marketed by the COATEX company, with a dry weight content equal to 0.25% of the dry weight of kaolin.

To achieve this, for each known density class represented in table IX, the supernatant phase is recovered and analysed, the sink phase is collected and is then input to a density higher than the previous density, for each class creating an analysed supernatant phase and a sink phase which in turn will be input to a higher density.

TABLE IX

| Density ds fixed as the separation threshold | kaolin in g/l powder to create ds | Limits of each density class | % by weight in each class | | |
|---|---|---|---|---|---|
| | | | PS | ABS | talc-filled PP |
| 1.020 | 33.08 | [1.000 to 1.020[ | 1.25% | 0.60% | 6.40% |
| 1.042 | 70.09 | [1.020 to 1.042[ | 22.30% | 0.00% | 16.50% |
| 1.050 | 83.87 | [1.042 to 1.050[ | 35.55% | 1.60% | 17.15% |
| 1.053 | 89.08 | [1.050 to 1.053[ | 10.08% | 3.25% | 8.05% |
| 1.055 | 92.56 | [1.053 to 1.055[ | 8.25% | 5.65% | 3.10% |
| 1.058 | 97.80 | [1.055 to 1.058[ | 3.95% | 6.35% | 5.25% |
| 1.060 | 101.3 | [1.058 to 1.060[ | 9.05% | 14.40% | 7.60% |
| 1.065 | 110.10 | [1.060 to 1.065[ | 5.62% | 17.10% | 10.35% |
| 1.070 | 118.95 | [1.065 to 1.070[ | 2.75% | 25.80% | 9.30% |
| 1.080 | 136.94 | [1.070 to 1.080[ | 1.20% | 24.25% | 15.900% |

TABLE IX-continued

| Density ds fixed as the separation threshold | kaolin in g/l powder to create ds | Limits of each density class | % by weight in each class | | |
|---|---|---|---|---|---|
| | | | PS | ABS | talc-filled PP |
| 1.090 | 154.97 | [1.080 to 1.090[ | 0.00% | 1.00% | 0.40% |
| 1.100 | 173.33 | [1.090 to 1.100[ | 0.00% | 0.00% | 0.00% |
| TOTAL | | | 100% | 100% | 100% |

The quantities of kaolin used in each density class are determined by the density measurement and can vary depending on the purity of the kaolin used.

As shown in table IX:

most PS is present within the density interval [1.020-1.055[ forming a first group for crystal PS, but a second density group appears in the [1.055-1.070[ interval corresponding to impact PS, remembering that some of the PS present is probably fire retardant. These various density classes are statistically justified by the presence of several PS families in this waste polymer to be reused.

ABS is also distributed in several density classes, but most ABS present is within the density interval [1.058-1.080[. There is also a wide distribution of densities for ABS, due to the presence of several types of ABS for which the composition can vary by the relative quantities of their monomers and also by the presence of fire retarders.

talc-filled PP is also distributed in several classes due to large density variations caused by the presence of the talc filler that can vary from 5% by weight to 20% by weight.

The mix of waste polymer materials to be reused extracted from each density class in table II is subjected to a new separation by increasing or decreasing density using a dense separation medium, so as to effectively separate the PS, ABS and talc-filled PP present in the same density class, this dense separation medium consisting of:

An aqueous phase with a conductivity of 6.9 ms and a pH of 7.26,

Powder kaolin with a median diametric dimension of 1 μm and for which the size grading cut-off is 30 μm and for which quantities by weight are expressed in table III below the DV 167 water soluble phosphated copolymer marketed by the COATEX Company, with a dry weight content equal to 0.25% of the dry weight of $CaCO_3$.

For example, only two density separation classes output from table II are selected and treated according to the invention, to illustrate the capacity of the selective separation process for creating stable separative suspensions with invariable density, when the density level "ds" chosen as the separation threshold for the various waste polymer materials to be separated is achieved, the precision of the absolute value of the density can be as good as |0.001|, in other words it is possible to achieve a precision about the chosen value "ds" equal to "ds"±0.0005.

However, it should be remembered that waste polymers with different chemical natures but exactly the same density cannot be separated by the method according to the invention and other separation methods based on other criteria are necessary.

The two density classes derived from table II and treated using the method according to the invention are as follows:

[1.042 to 1.050[
and [1.065 to 1.070[

To achieve this, for each known density class represented in table X, the supernatant phase is recovered and analysed, the sink phase is collected and is then input to a density higher than the previous density, for each class creating an analysed supernatant phase and a sink phase which in turn will be input to a higher density.

This very selective separation gave the results entered class by class in Table X below:

TABLE X

| Density ds fixed as the separation threshold | kaolin in g/l powder to create ds | Limits of each density class | % by weight in each class | | |
|---|---|---|---|---|---|
| | | | PS | ABS | talc-filled PP |
| 1.043 | 72.16 | [1.042-1.043[ | 0 | 0 | 0.608 |
| 1.044 | 73.89 | [1.043-1.044[ | 0 | 0 | 0.610 |
| 1.045 | 75.62 | [1.044-1.045[ | 0 | 0 | 0.754 |
| 1.046 | 77.35 | [1.045-1.046[ | 0 | 0 | 1.027 |
| 1.047 | 79.08 | [1.046-1.047[ | 0 | 0 | 0.307 |
| 1.048 | 80.81 | [1.047-1.048[ | 0 | 0 | 0.920 |
| 1.049 | 82.55 | [1.048-1.049[ | 7.12 | 0 | 3.049 |
| 1.050 | 84.29 | [1.049-1.050[ | 15.105 | 0 | 9.125 |
| 1.066 | 112.42 | [1.065-1.066[ | 1.052 | 0.113 | 6.125 |
| 1.067 | 114.20 | [1.066-1.067[ | 0.920 | 0.320 | 1.950 |
| 1.068 | 115.98 | [1.067-1.068[ | 1.248 | 0.827 | 1.058 |
| 1.069 | 117.76 | [1.068-1.69[ | 1.065 | 5.686 | 0.745 |
| 1.070 | 119.55 | [1.069-1.070[ | 1.315 | 10.254 | 0.522 |

As shown in table X, the method according to the invention gives excellent control over selective density separation of the polymer materials present in the mix, the sensitivity of the separation density being equal to ±0.0005 about the chosen density threshold "ds".

However, the initial industrial mix dealt with in this example contains polymer materials with the same density but a different composition, such that other separation means have to be used to separate each type of polymer with identical density present in each fraction.

The invention claimed is:

1. Method for selective separation by density of each constituent of a mix of organic synthetic materials to be reused by recycling, stable within a precision level of ±0.0005 about a density level (ds) chosen as the density separation threshold equal to at least 1, and comprising separating them by density difference, in an aqueous suspension of an appropriate quantity of powder particles dispersed in a sufficient quantity to create the density level (ds) chosen as the separation threshold of at least one of the constituents of the mix of synthetic organic materials to be selectively separated, wherein the separative suspension is formed from:

a) solid powder particles with a size grading cutoff not more than 5 μm, these solid powder particles thus sized being dispersed in the aqueous phase in a sufficient quantity to reach the chosen density threshold (ds), b) a water soluble stabiliser to stabilise the rheological and invariance characteristics of the density (ds) with a precision of said density (ds) of the suspension of solid powder particles equal to ±0.0005.

2. Method according to claim 1, wherein the powder particles have a median diameter between 1 μm and 0.005 μm.

3. Method according to claim 1, wherein the powder particles are of natural origin and are at least one of clays, belonging to families consisting of the group composed of kaolinites, comprising kaolinite, dickite, halloysite, disordered kaolinites, serpentines, the micas group and particularly muscovite, biotite, paragonite, pyrophyllite and talc, illites and glauconite, the montmorillonites group, stevensite, saponite, hectorite; the chlorites group; the vermiculites group; the interstratified clays group for which the unit structure is a combination of the previous groups; the fibrous clays group, sepiolite; the group consisting of calcium carbonate, magnesium carbonate, dolomite, dehydrated calcium sulphate, barium sulphate, talc, alumina, silica, titanium dioxide, zirconia, taken alone or mixed.

4. Method according to claim 1, wherein the powder particles are of synthetic origin and are selected from the group consisting of glass powders, precipitated calcium carbonate, and metallic powders, taken alone or mixed.

5. Method according to claim 1, wherein the water soluble agent for stabilisation of rheological characteristics and to maintain the apparent density (ds) of the suspension of solid powder particles, is selected from phosphates and polyphosphates, alkylphosphate esters, alkylphosphonate, alkylsulfate, alkylsulfonate esters, lignin, lignosulfonates in the form of calcium, sodium, iron, chromium, iron and chromium salts, copolymers of maleic anhydride and sulfonic styrene acid, substituted, neutralised, esterified or non-esterified copolymers of methylacrylamide and (methyl)acrylic acid, copolymers of sulfonic methylacrylamido-alkyl acid and (methyl)acrylamide acid, water soluble polymers of acrylic acid used in acid form of possibly wholly or partly neutralised by alkaline and/or alkali earth agents, by amines salified by single-valent and/or polyvalent ions, and/or esterified, or by water soluble acrylic copolymers with phosphated, phosphonated, sulphated or sulfonated functions.

6. Method according to claim 5, wherein the water soluble agent is chosen from among water soluble acrylic copolymers satisfying the general formula:

wherein:

Z is a phosphate, phosphonate, sulphate, sulfonate with at least one free acid function;

n is between 0 and 95;

p is between 95 and 5;

q is between 0 and 95;

wherein the total value of n+p+q is equal to 100;

$R_1$ and $R_2$ are hydrogen simultaneously, or one is hydrogen while the other is a carboxylic acid, optionally esterified by a $C_1$ to $C_{12}$ alcohol;

$R_3$ is hydrogen or a $C_1$ to $C_{12}$ alkyl radical;

$R_4$ and $R_5$ are simultaneously or separately hydrogen, a $C_1$ to $C_{12}$ alkyl radical, a substituted or non-substituted aryl, or a carboxylic acid, optionally esterified by a $C_1$ to $C_{12}$ alcohol;

$R_6$ is:
an alkylene with formula $(CH_2)_r$, wherein r is 1 to 12,
an oxide or polyoxide of alkylene with formula $(R_8O)_s$, wherein $R_8$ is a $C_1$ to $C_4$ alkylene and s is 1 to 30, or
a combination of $(CH_2)_r$ and $(R_8O)_s$;

$R_7$ is hydrogen or a $C_1$ to $C_{12}$ alkyl radical;

when n=0, one of $R_9$ and $R_{10}$ are hydrogen and the other is a carboxylic group, and when n≠0, $R_9$ and $R_{10}$ are simultaneously hydrogen, or one is hydrogen and the other is a carboxylic group, a $C_1$ to $C_{12}$ ester, a $C_1$ to $C_{12}$ alkyl, a $C_5$ or $C_6$ aryl, or an alkylaryl;

$R_{11}$ is hydrogen, a carboxylic group, a $C_1$ to $C_3$ alkyl, or a halogen;

$R_{12}$ is a $C_1$ to $C_{12}$ ester, a substituted or non-substituted amide, a $C_1$ to $C_{12}$ alkyl, $C_5$ or $C_6$ aryl, an alkylaryl, a halogen, a carboxylic group or an alkyl or aryl phosphated, phosphonated, sulphated, sulfonated group.

7. Method according to claim 6, wherein, in Z, the non-free acid functions are occupied by a cation, an ammonium group, an amine, a $C_1$ to $C_3$ alkyl, an optionally substituted $C_3$ to $C_6$ aryl, an alkylaryl, a $C_1$ to $C_{12}$ ester, or a substituted amide.

8. Method according to claim 7, wherein the total value of n+p+q, n=0, when q>0 and q=0 when n>0.

9. Method according to claim 7, wherein, in $R_1$ and $R_2$, the alcohol esterifying the carboxylic function is a $C_1$ to $C_4$ alcohol.

10. Method according to claim 8, wherein $R_3$ is a $C_1$ to $C_4$ alkyl radical.

11. Method according to claim 7, wherein $R_4$ and $R_5$ are a $C_1$ to $C_4$ alkyl radical.

12. Method according to claim 7, wherein, in $R_4$ and $R_5$, the alcohol esterifying the carboxylic function is a $C_1$ to $C_4$ alcohol.

13. Method according to claim 7, wherein $R_7$ is a $C_1$ to $C_4$ alkyl radical.

14. Method according to claim 7, wherein $R_5$ and $R_{10}$ are a $C_1$ to $C_3$ ester.

15. Method according to claim 6, wherein $R_9$ and $R_{10}$ are a $C_1$ to $C_3$ alkyl.

16. Method according to claim 6, wherein $R_{12}$ is a $C_1$ to $C_5$ ester.

17. Method according to claim 6, wherein $R_{12}$ is a $C_1$ to $C_3$ alkyl.

18. Method according to claim 6, wherein the molecular mass $M_w$ of water soluble acrylic copolymers forming the stabilisation agent is between 5,000 and 100,000.

19. Method according to claim 6, wherein the water soluble acrylic copolymers forming the stabilisation agent are at least partially neutralised, using a neutralisation agent selected from the group consisting of sodium hydroxide, potassium hydroxide, ammonium hydroxide, calcium hydroxide, magnesium hydroxide, a primary amine, a secondary amine, a tertiary amine, an aliphatic amine, and a cyclic amine.

20. Method according to claim 1, wherein the quantity by weight of the water soluble stabilisation agent is expressed as the dry weight of said agent as a percentage of the dry weight of powder particles put in suspension, and is between 0.02% and 5% dry weight based on the dry weight of the powder particles.

21. Method according to claim 1, wherein the aqueous phase has a conductivity of not more than 50 ms.

22. Method according to claim 1, wherein said method is carried out in at least one hydraulic separator.

23. Method according to claim 22, wherein, when said method is carried out in a single hydraulic separator, the chosen density (ds) varies:
- in increasing order, by controlled addition of the defined powder particles and the water soluble stabilisation agent in the suspension present in the said hydraulic separator, until the new chosen threshold density (ds) is obtained,
- in decreasing order, by adding water until obtaining the new chosen threshold density (ds).

24. Method according to claim 23, wherein the density of the separative stable suspension is varied, to increase it or to decrease it, while maintaining mechanical stirring of the dense aqueous medium being corrected and/or while recirculating the dense medium by drawing off from the bottom of the hydraulic separator and reinjection at the top of said separator.

25. Method according to claim 22, wherein if said method is performed in several hydraulic separators, the various separators are placed one after the other, using a cascade system operating with stable suspensions each having a precise density threshold (ds) in an increasing or decreasing order of the densities.

26. Method according to claim 22 wherein the threshold density (ds) of the precise aqueous separative suspension is continuously controlled by appropriate measurement means and is corrected as soon as a drift is detected.

27. Method according to claim 26, wherein the density of the dense medium contained in each hydraulic separator is controlled using two solenoid valves each opening onto two circuits connected to two reservoirs, one of the reservoirs containing a concentrated mother suspension of powder particles, stabilised with a water soluble stabilisation agent so that a determined quantity of a mother suspension can be added to make an upward correction to any downward drift in the density of the dense precise separation medium, the other tank containing water so that a determined quantity of water can be added to make a downward correction to any upward drift in the density of the dense precise separation medium.

28. Method according to claim 27, wherein the density of the dense medium in each hydraulic separator is measured continuously by appropriate measurement instruments that trigger opening of one of the solenoid valves and then close it when the threshold density (ds) is reached.

29. Method according to claim 22, wherein each suspension may be recirculated in each hydraulic separator by drawing off said suspension at the bottom of said separator and reinjecting it into the upper part.

30. A method of claim 1, wherein said method is for selectively separating mixed polymer materials.

* * * * *